(12) United States Patent
Garcia-Osuna et al.

(10) Patent No.: US 7,460,435 B2
(45) Date of Patent: Dec. 2, 2008

(54) ACOUSTIC TRANSDUCERS FOR TUBULARS

(75) Inventors: Fernando Garcia-Osuna, Sugar Land, TX (US); Jean Pierre Masson, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/904,813

(22) Filed: Nov. 30, 2004

(65) Prior Publication Data

US 2005/0152219 A1 Jul. 14, 2005

Related U.S. Application Data

(60) Provisional application No. 60/534,900, filed on Jan. 8, 2004, provisional application No. 60/535,062, filed on Jan. 8, 2004.

(51) Int. Cl.
*G01V 1/40* (2006.01)
*G01V 1/52* (2006.01)

(52) U.S. Cl. .................. 367/25; 367/35; 181/102; 181/105; 181/106

(58) Field of Classification Search .............. 367/25, 367/31, 35, 169, 75; 181/102, 104, 105, 181/106
See application file for complete search history.

(56) References Cited

U.S. PATENT DOCUMENTS

| 3,191,141 A | 6/1965 | Schuster |
| 3,593,255 A | 7/1971 | White et al. |
| 3,786,894 A | 1/1974 | Lebreton |
| 3,794,976 A | 2/1974 | Mickler |
| 3,964,014 A | 6/1976 | Tehon |
| 4,122,430 A | 10/1978 | Leisterer et al. |
| 4,525,644 A | 6/1985 | Frohlich |
| 4,649,525 A | 3/1987 | Angona et al. |
| 4,649,526 A | 3/1987 | Winbow et al. |
| 4,665,511 A | 5/1987 | Rodney et al. |

(Continued)

FOREIGN PATENT DOCUMENTS

DE    23 46 649 A1    3/1975

(Continued)

OTHER PUBLICATIONS

Borre, M. et al., "Fluid Substitution in Horizontal Chalk Wells and its Effect on Acoustic Rock Properties—a Case Study Comparing Logging While Drilling and Wireline Acoustic Data," SPWLA 45th Annual Logging Symposium, Jun. 6-9, 2004; pp. 1-12.

(Continued)

*Primary Examiner*—Jack W Keith
*Assistant Examiner*—Scott A Hughes
(74) *Attorney, Agent, or Firm*—Matthias Abrell; Jaime Castano; Dale Gaudier

(57) ABSTRACT

Acoustic transducers configured with transducer elements disposed on an arch or arcuate shaped member adapted to fit in juxtaposition around a tubular. The arcuate shaped member is adapted with conductors to provide a voltage to the transducer elements. One embodiment uses a metallic arcuate shaped member. Embodiments implemented as sources are used to excite borehole acoustic modes. Some embodiments provide phased array acoustic energy excitation/signal reception. The transducers are covered with a sealer in a liquid-free configuration and shields are used to protect the transducers.

19 Claims, 11 Drawing Sheets

U.S. PATENT DOCUMENTS

| | | | |
|---|---|---|---|
| 4,700,803 A * | 10/1987 | Mallett et al. | 367/31 |
| 4,813,028 A | 3/1989 | Liu | |
| 4,932,003 A * | 6/1990 | Winbow et al. | 367/25 |
| 4,947,683 A | 8/1990 | Minear et al. | |
| 4,951,267 A | 8/1990 | Chang et al. | |
| 4,979,151 A * | 12/1990 | Ekstrom et al. | 367/35 |
| 5,027,331 A | 6/1991 | Winbow et al. | |
| 5,030,873 A | 7/1991 | Owen | |
| 5,036,945 A | 8/1991 | Hoyle et al. | |
| 5,043,952 A | 8/1991 | Hoyle et al. | |
| 5,058,078 A | 10/1991 | Eyl et al. | |
| 5,063,542 A | 11/1991 | Petermann et al. | |
| 5,077,697 A | 12/1991 | Chang | |
| 5,081,391 A * | 1/1992 | Owen | 367/75 |
| 5,251,188 A | 10/1993 | Parsons et al. | |
| 5,265,067 A * | 11/1993 | Chang | 367/31 |
| 5,309,404 A | 5/1994 | Kostek et al. | |
| 5,354,956 A | 10/1994 | Orban et al. | |
| 5,377,160 A | 12/1994 | Tello et al. | |
| 5,387,767 A | 2/1995 | Aron et al. | |
| RE34,975 E | 6/1995 | Orban et al. | |
| 5,444,324 A | 8/1995 | Priest et al. | |
| 5,469,736 A | 11/1995 | Moake | |
| 5,583,293 A | 12/1996 | Flogel | |
| 5,640,371 A | 6/1997 | Schmidt et al. | |
| 5,678,643 A | 10/1997 | Robbins et al. | |
| 5,719,329 A | 2/1998 | Jepson et al. | |
| 5,753,812 A | 5/1998 | Aron et al. | |
| 5,796,677 A | 8/1998 | Kostek et al. | |
| 5,852,262 A | 12/1998 | Gill et al. | |
| 5,852,587 A | 12/1998 | Kostek et al. | |
| 5,886,303 A | 3/1999 | Rodney | |
| 5,936,913 A | 8/1999 | Gill et al. | |
| 5,987,385 A * | 11/1999 | Varsamis et al. | 702/6 |
| 6,069,845 A | 5/2000 | Ambs | |
| 6,084,826 A | 7/2000 | Legett, III | |
| 6,102,152 A | 8/2000 | Masino et al. | |
| 6,213,250 B1 | 4/2001 | Wisniewski et al. | |
| 6,366,531 B1 | 4/2002 | Varsamis et al. | |
| 6,466,513 B1 * | 10/2002 | Pabon et al. | 367/35 |
| 6,474,439 B1 | 11/2002 | Hoyle et al. | |
| 6,501,211 B1 | 12/2002 | Nasrollahzadeh | |
| 6,568,486 B1 | 5/2003 | George | |
| 6,614,360 B1 | 9/2003 | Leggett, III et al. | |
| 6,631,327 B2 | 10/2003 | Hsu et al. | |
| 6,643,221 B1 | 11/2003 | Aron et al. | |
| 6,711,096 B1 | 3/2004 | Benjamin | |
| 6,788,263 B2 | 9/2004 | Clark et al. | |
| 2002/0113717 A1 | 8/2002 | Tang et al. | |
| 2003/0015037 A1 | 1/2003 | Stephens et al. | |
| 2003/0117895 A1 | 6/2003 | Brandsaeter | |
| 2003/0150273 A1 | 8/2003 | Ptchelintsev et al. | |
| 2004/0061622 A1 | 4/2004 | Clark | |
| 2004/0095847 A1 | 5/2004 | Hassan et al. | |
| 2004/0158997 A1 | 8/2004 | Tang | |

FOREIGN PATENT DOCUMENTS

| | | |
|---|---|---|
| EP | 0 778 473 A2 | 6/1997 |
| EP | 1467060 | 10/2004 |
| EP | 1469161 | 10/2004 |
| GB | 2 130 725 A | 6/1984 |
| GB | 2287789 | 9/1995 |
| GB | 2381847 * | 5/2003 |
| WO | WO03/060559 | 7/2003 |

OTHER PUBLICATIONS

Gravem, T. et al., "North-Sea Acoustic LWD Field-Test Results Utilizing Integrated System Approach," SPWLA 44th Annual Logging Symposium, Jun. 22-25, 2003; pp. 1-11.

\* cited by examiner

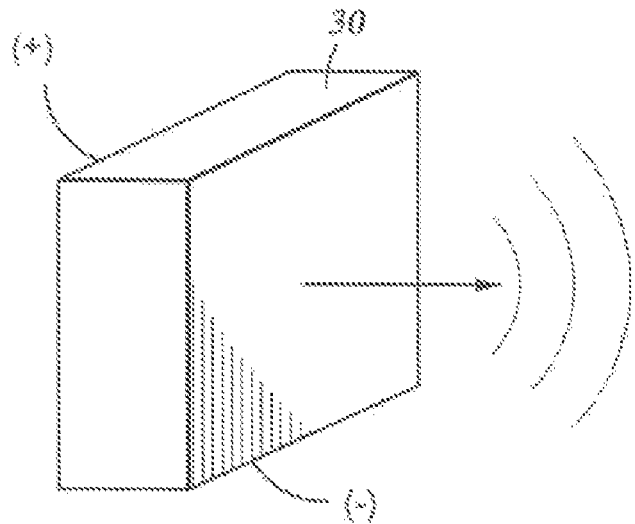
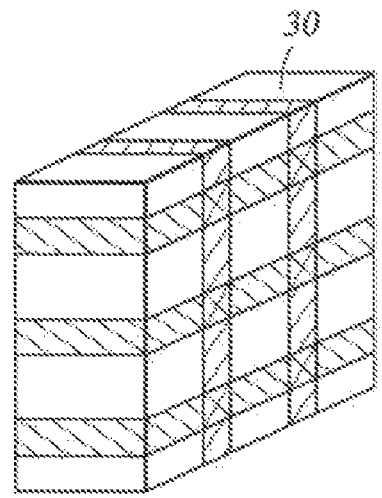
Fig. 2A
(PRIOR ART)
Fig. 2B
(PRIOR ART)
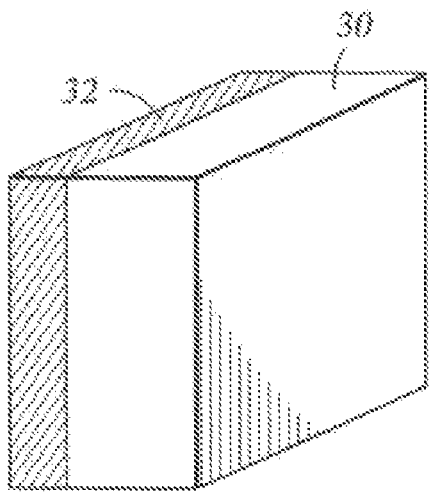
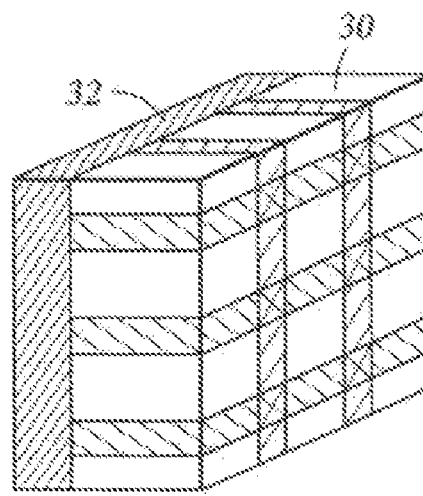
Fig. 3A
Fig. 3B

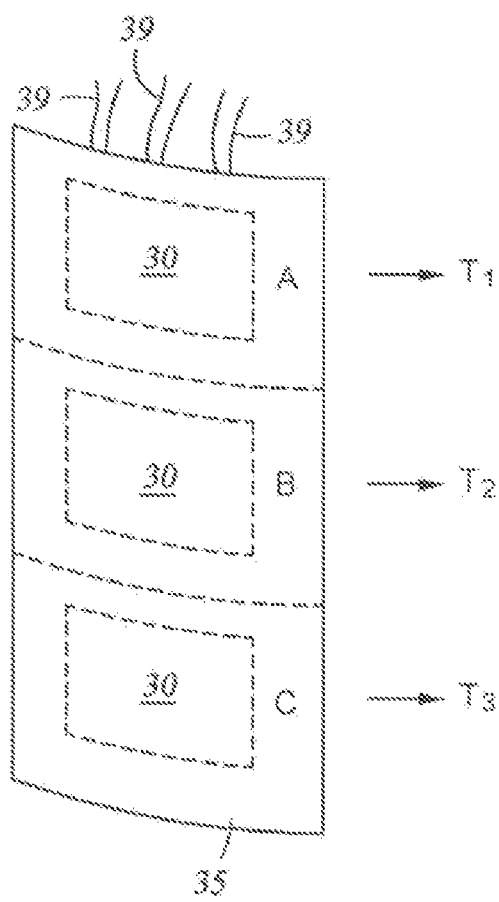
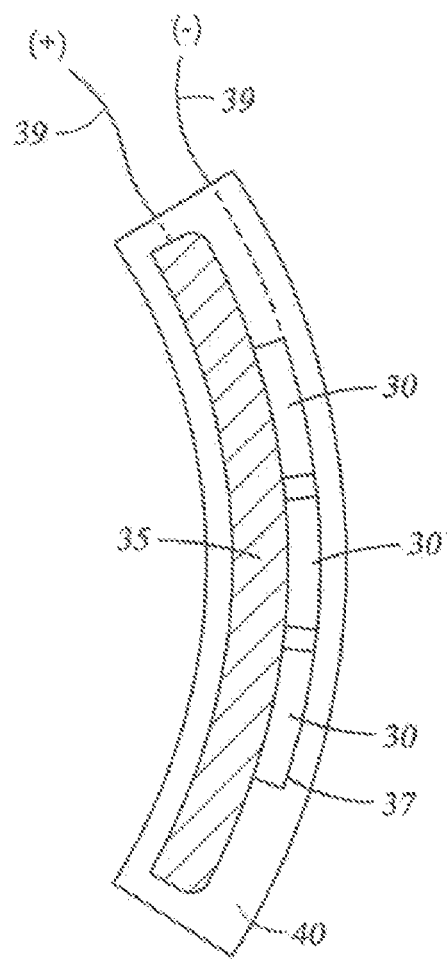
Fig. 12
Fig. 13

ACOUSTIC TRANSDUCERS FOR TUBULARS

CROSS-REFERENCE TO RELATED APPLICATIONS

This invention claims priority pursuant to 35 U.S.C. § 119 of U.S. Provisional Patent Application Ser. No. 60/535,062, filed on Jan. 8, 2004, and U.S. Provisional Patent Application Ser. No. 60/534,900, filed on Jan. 8, 2004. These Provisional Applications are hereby incorporated by reference in their entirety.

BACKGROUND OF INVENTION

1. Field of the Invention

The invention relates generally to acoustic transducers. More particularly, this invention relates to improved acoustic transducers for use on tubulars.

2. Background Art

In the oil and gas industry, subsurface formations are typically probed by well logging instruments to determine the formation characteristics. Among these instruments, sonic tools have been found to provide valuable information regarding subsurface acoustic properties, which may be used to produce images or derive related characteristics for the formations.

Acoustic waves are periodic vibrational disturbances resulting from acoustic energy that propagates through a medium, such as a subsurface formation. Acoustic waves are typically characterized in terms of their frequency, amplitude, and speed of propagation. Acoustic properties of interest for formations may include compressional wave speed, shear wave speed, borehole modes, and formation slowness. Additionally, acoustic images may be used to depict borehole wall conditions and other geological features away from the borehole. These acoustic measurements have applications in seismic correlation, petrophysics, rock mechanics and other areas.

Recordings of acoustic properties as functions of depth are known as acoustic logs. Information obtained from acoustic logs may be useful in a variety of applications, including well to well correlation, porosity determination, determination of mechanical or elastic rock parameters to give an indication of lithology, detection of over-pressured formation zones, and the conversion of seismic time traces to depth traces based on the measured speed of sound in the formation.

Sonic logging of earth formations entails lowering an acoustic logging instrument or tool into a borehole traversing the formation. The instrument typically includes one or more acoustic sources (i.e., a transmitter) for emitting acoustic energy into the subsurface formations and one or more acoustic sensors or receivers for receiving acoustic energy. The transmitter is periodically actuated to emit pulses of acoustic energy into the borehole, which travel through the borehole and into the formation. After propagating through the borehole and formation, some of the acoustic energy travels to the receivers, where it is detected. Various attributes of the detected acoustic energy are subsequently related to subsurface or tool properties of interest.

FIG. 1 shows a conventional downhole sonic tool. The tool 10 is shown disposed in a borehole 12 traversing an earth formation 20. The borehole 12 is typically filled with a drilling fluid 14 ("mud") that is used during the drilling of the borehole. The tool 10 is generally implemented in a tubular 13 support, which in the case of a drill collar includes an internal passage 13A for drilling fluid 14 to reach a mud motor and/or a drill bit at the bottom of a drill string (not shown) as known in the art. The logging tool 10 includes one or more acoustic sources 16 and a plurality of acoustic receivers 18 disposed on the tubular 13. The receivers 18 are shown spaced apart from each other, along the longitudinal axis of the tool 10, at a selected distance h. One of the receivers 18 closest to the source 16 is axially spaced therefrom by a selected distance a. The tool 10 also houses one or more conventional computer modules 21 including microprocessors, memory, and software to process waveform signal data as known in the art. As also known in the art, the computer module(s) 21 can be disposed within the instrument, at the earth surface, or combined between the two as shown in FIG. 1. Acoustic energy waves 22 are shown propagating in the borehole. Conventional sonic downhole tools are described in U.S. Pat. Nos. 5,852,587, 4,543,648, 5,510,582, 4,594,691, 5,594,706, 6,082,484 6,631,327, 6,474,439, 6,494,288, 5,796,677, 5,309,404, 5,521,882, 5,753,812, RE34,975 and 6,466,513.

Conventional acoustic tools are equipped with acoustic transducer elements, such as piezoelectric elements. In general, an acoustic transducer converts energy between electric and acoustic forms and can be adapted to act as a source or a sensor. Acoustic transducers are typically mounted on the tubular body of the logging instrument as shown in FIG. 1. Conventional acoustic sources and sensors used in downhole tubulars are described in U.S. Pat. Nos. 6,466,513, 5,852,587, 5,886,303, 5,796,677, 5,469,736 and 6,084,826. Conventional logging-while-drilling (LWD) sonic tools have omni-directional transmitters (i.e., monopole sources) (See U.S. Pat. Nos. 5,796,677, 5,852,262). Conventional wireline sonic tools, however, use independent sound sources to excite the borehole's acoustic modes (See, e.g., U.S. Pat. Nos. 5,852,587, 6,102,152, 6,474,439). In large boreholes and slow rock formation conditions, shear wave measurements are difficult to achieve with pure monopole acoustic tools. In these conditions it is necessary to use different types of logging tools with sound sources that simultaneously or independently excite the borehole's acoustic modes. U.S. Pat. Nos. 6,614,360 and 6,084,826 describe downhole tubulars equipped with acoustic transducers. A drawback of the proposed transducers is the use of oil compensation in the assembly, which complicates construction and affects reliability.

A need remains for improved acoustic transducers, particularly for applications entailing tubulars adapted for disposal in subsurface formations.

SUMMARY OF INVENTION

An aspect of the invention provides an acoustic transducer for use on a tubular. The transducer comprising an arcuate shaped member; a plurality of acoustic transducer elements disposed on the member forming rows; the arcuate shaped member adapted with conductors to provide a voltage to the transducer elements; wherein the arcuate shaped member and transducer elements are covered with a sealing material; and wherein the covered arcuate shaped member does not include liquids.

An aspect of the invention provides an acoustic transducer for use on a tubular. The transducer comprising a plurality of independent arcuate shaped members, each member adapted to form a sector of a cylindrical surface of revolution; each arcuate shaped member having a plurality of acoustic transducer elements disposed thereon; each arcuate shaped member adapted with conductors to provide a voltage to the elements; wherein each arcuate shaped member and its respective transducer elements are covered with a sealing material; and wherein the covered arcuate shaped members do not include liquids.

An aspect of the invention provides an acoustic transducer for use on a tubular. The transducer comprising an arcuate shaped member adapted for placement on a tubular; a plurality of acoustic transducer elements disposed on the arcuate shaped member forming rows; each transducer element having first and second planar surfaces with a heavy-mass material juxtaposed to one of the planar surfaces; a first conductor disposed in the arcuate shaped member in contact with the first planar surfaces of the transducer elements and adapted to provide a negative voltage to the elements; a second conductor disposed in the arcuate shaped member in contact with the second planar surfaces of the transducer elements and adapted to provide a positive voltage to the elements; and wherein the arcuate shaped member and transducer elements are covered with a sealing material.

An aspect of the invention provides an acoustic transducer for use on a tubular. The transducer comprising an arcuate shaped metallic member; a plurality of acoustic transducer elements disposed on the metallic member; the metallic arcuate shaped member adapted to provide a voltage to the transducer elements disposed thereon; and wherein the transducer elements are covered to protect against external fluids.

An aspect of the invention provides a wellbore apparatus. The apparatus comprising a tubular adapted for disposal within the wellbore; at least one arcuate shaped member adapted to function as an acoustic transducer and for disposal on the tubular, the arcuate shaped member being independently formed with respect to the tubular; each at least one arcuate shaped member having a plurality of acoustic transducer elements disposed thereon forming rows; each at least one arcuate shaped member adapted with conductors to provide a voltage to the transducer elements disposed thereon; each at least one arcuate shaped member and its respective transducer elements being covered with a sealing material; and wherein each at least one covered arcuate shaped member does not include liquids.

An aspect of the invention provides a method of deploying an acoustic transducer on a tubular. The method including disposing an arcuate shaped member on the exterior of the tubular, the arcuate shaped member being independently formed with respect to the tubular and having a plurality of acoustic transducer elements disposed thereon forming rows, the member adapted with conductors to provide a voltage to the transducer elements and covered with a sealing material not including liquids.

An aspect of the invention provides a method of deploying an acoustic transducer on a tubular. The method including disposing a metallic arcuate shaped member on the exterior of the tubular, said arcuate shaped member being independently formed with respect to the tubular and having at least one acoustic transducer element disposed thereon, the member being covered with a sealing material not including liquids.

BRIEF DESCRIPTION OF DRAWINGS

FIG. 2A is a schematic of a typical transducer element.

FIG. 2B is a schematic of a typical 1-3 piezocomposite type transducer element.

FIG. 3A is a schematic of a transducer element loaded with a heavy-mass material in accord with the invention.

FIG. 3B is a schematic of a 1-3 piezocomposite type transducer element loaded with a heavy-mass material in accord with the invention.

FIG. 12 is a 2-D projection of an arcuate shaped member configured with electrically isolated sets of transducer elements arranged for phased-array excitation/signal reception in accord with the invention.

FIG. 13 is an overhead view of a metallic arcuate shaped transducer in accord with the invention.

DETAILED DESCRIPTION

The present invention discloses acoustic transducers that can be implemented in multiple configurations and different diameters in order to fit any tubular. Embodiments of the invention make it possible to excite the wellbore's acoustic modes over a broad frequency range with improved mode purity excitation using a single transducer unit. The transducer design is based on transducer elements implemented in a semi-cylindrical or arch shaped configuration.

FIG. 2A shows a typical transducer element 30 implemented in the invention. The transducer element 30 may be a single or multilayer (stack) element to improve sound radiation and acoustic output pressure level. Useable elements 30 include piezoelectric devices, lead titanate (PT) devices, lead zirconate-titanate (PZT) devices, 1-3 piezocomposite type devices, or any other suitable material known in the art. The element 30 is preferably polarized in the thickness mode. When a positive voltage is applied to a planar surface of the element 30 and a negative voltage to the opposing planar surface, the element expands and contracts, emitting acoustic energy. FIG. 2B shows a typical 1-3 piezocomposite type transducer element 30 implemented in the invention.

FIG. 3A shows an embodiment of a single rectangular piezoelectric element 30 loaded on one side with a heavy-mass material 32. By disposing a heavy-mass material 32 to back the transducer element 30, the mass-loaded element provides improved sound directionality and improved sound radiation in a desired orientation when implemented as a source. FIG. 3B shows an embodiment of a single rectangular 1-3 piezocomposite type element 30 loaded on one side with a heavy-mass material 32.

Figure 1:
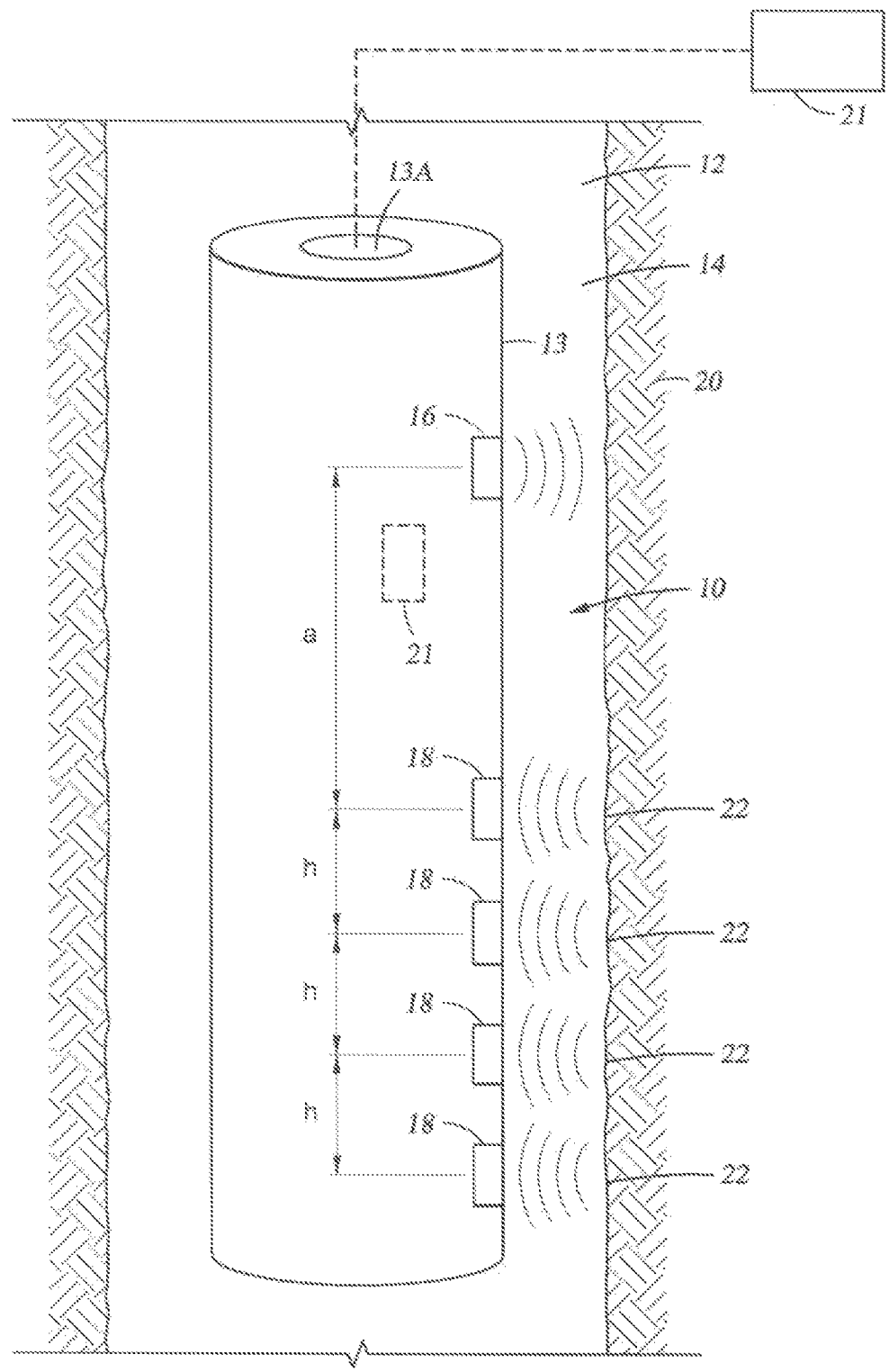
FIG. 1 is a schematic of a conventional downhole acoustic tool.
Figure 4:
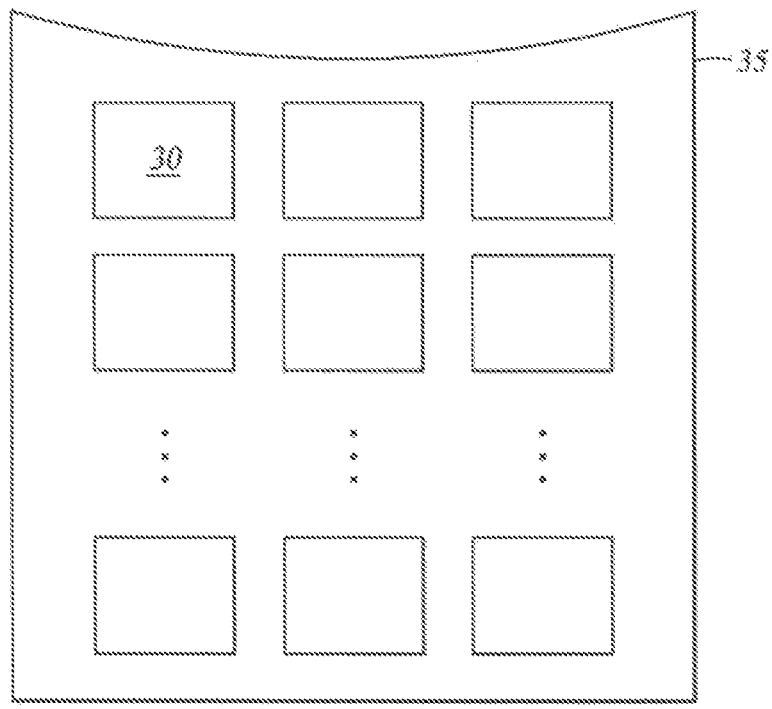
FIG. 4 is a 2-D projection of an arcuate shaped member equipped with transducer elements in accord with the invention.

FIG. 4 shows multiple individual transducer elements 30 disposed on an arch or arcuate shaped member 35 embodiment of the invention. Although the arcuate shaped member 35 is shown projected as a two-dimensional or planar surface for clarity of illustration, the member is "arcuate shaped" in view of the fact that the member is curved in cross-sectional shape. The term arcuate shaped member could also comprise, for example, a sector, quadrant, or semi-cylindrical surface of revolution, a half cylinder, or a curved quad section. In fact, the term "arcuate shaped member" could comprise any number of 'curved shaped' sections which, when juxtaposed together, would comprise or constitute a half cylinder. The arcuate shaped member 35 is formed from a nonconductive material. Useable materials include fiberglass, rubber compounds, synthetic resins, PEEK™, or any other suitable nonconductive material known in the art.

Figure 5:
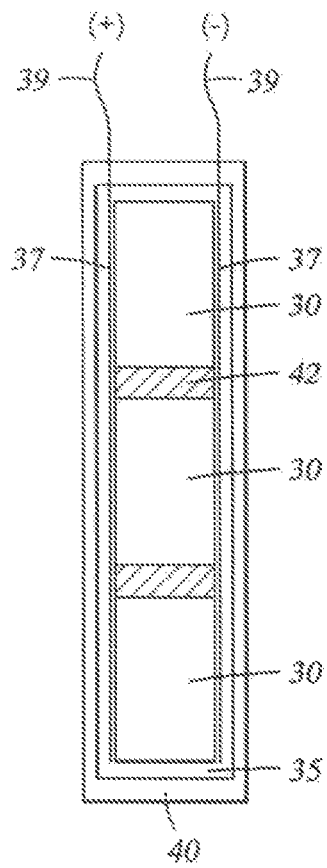
FIG. 5 is a cross-section view of an arcuate shaped acoustic transducer in accord with the invention.

FIG. 5 shows a cross-sectional view from the side end of an acoustic transducer of the invention. The transducer elements 30 are encased or molded within the nonconductive material forming the arcuate shaped member 35. The arcuate shaped member 35 may be formed using various manufacturing techniques known in the art. For example, one technique entails forming voids or openings in the arcuate shaped member 35 to house the transducer elements 30 and encasing the housed elements with additional material to complete the assembly. Another technique entails molding the arcuate shaped member 35 around the transducer elements 30 and conductors 37. Note that the embodiments illustrated herein are generally not shown in actual scale or precise dimensions for visual clarity. For example, the walls of the material forming the arcuate shaped member 35 may be formed in any desired thickness, but thinner walls are generally preferred for improved acoustic energy propagation.

Electrical conductors 37 are disposed within the arcuate shaped members 35 in contact with the surfaces of the transducer elements 30 to route the voltage/signals to/from the elements as further described below. The conductors 37 extend out from the ends of the arcuate shaped members 35, terminating in exposed leads 39. Any suitable conductor may be used as known in the art. Some embodiments can be configured with conductors 37 using a conductive material comprising a series of filament conductors forming a "mesh" layer disposed over the transducer elements 30. Conductive materials configured to form layers or films that can be used to implement the mesh-type conductors 37 are commercially available (See e.g., MARIAN™ products available on the Internet at http://www.marianinc.com). Some embodiments may be implemented with conductors 37 formed by chemical deposition techniques, masking techniques, or other known layering processes (not shown). Yet other embodiments of the invention may be implemented with conductors formed using as a strip referred to as a flex circuit (described in U.S. Pat. Nos. 6,351,127, 6,690,170, 6,667,620, 6,380,744). Flex-circuit type embodiments may be formed with a suitable material (e.g., polyimide film, dielectric film substrates, polyester film) impregnated with electrically conductive materials or substances. Techniques for producing strips to form flexible films are described in U.S. Pat. No. 6,208,031.

Arcuate transducer embodiments of the invention designed for subsurface use must be able to withstand the harsh conditions presented in wellbore environments. The arcuate shaped members 35, along with their housed transducer elements 30, can be protected by overmolding or covering the assemblies with a sealing material 40 forming a protective and sound transparent barrier. Useable sealing materials include rubber compounds or any other suitable resin or compound. The arcuate shaped members 35 may also be formed to completely encase the individual transducer elements 30. In other embodiments where gaps or spacing is left between the elements 30, a suitable nonconductive material 42 (e.g., rubber) may be added to fill the spaces between the elements.

Figure 6:
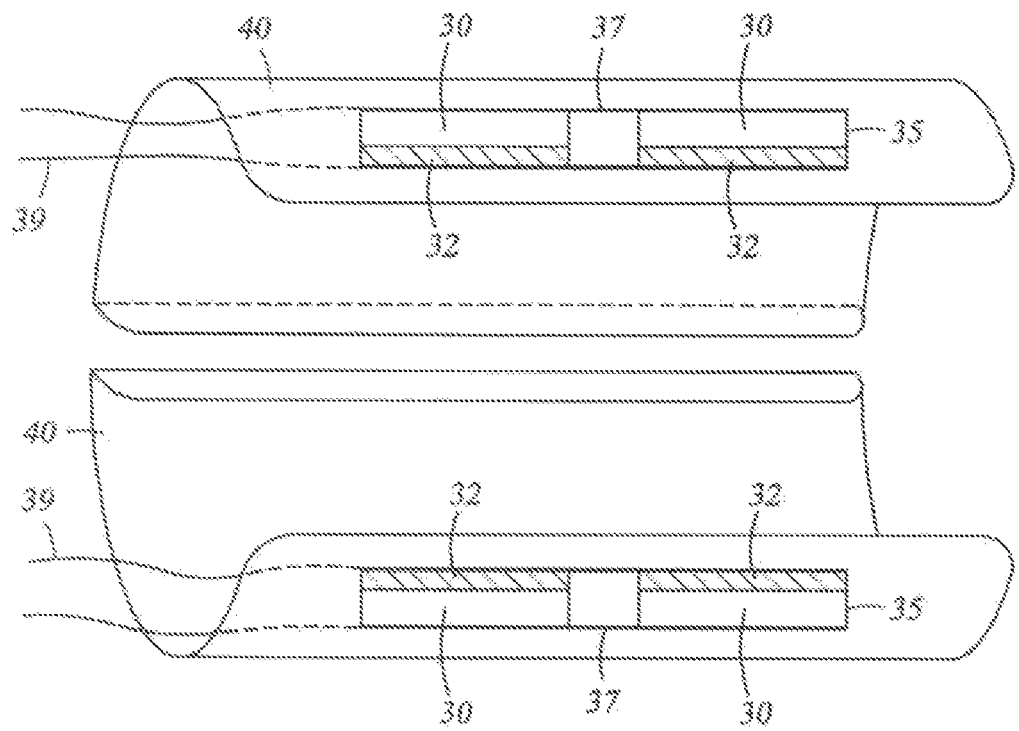
FIG. 6 is a schematic of two individual arcuate shaped acoustic transducers in accord with the invention.

FIG. 6 shows two individual acoustic transducer embodiments of the invention. Two arcuate shaped members 35 are shown with their sides in cross-sectional views to illustrate the placement of the transducer elements 30 on the members. These source embodiments are implemented with heavy-mass loaded transducer elements 30. Other embodiments may be implemented with unloaded or plain transducer elements such as shown in FIG. 2. For clarity of illustration, the transducer embodiments in FIG. 6 are shown with two transducer elements 30 disposed in each arcuate shaped member 35. Other embodiments may be implemented with any number of transducer elements disposed in the arcuate shaped member forming any number of rows or columns as desired (See e.g., FIG. 4).

The transducer shown in FIG. 6 are implemented with the heavy-mass material 32 pieces placed adjacent to the transducer elements 30 facing the concave sides of the arcuate shaped members 35 and encased within the members. Each member 35 is fully covered with the sealing material 40 to form a waterproof unit. The transducer elements 30 are electrically connected in parallel by the conductors 37 disposed within the arcuate shaped members 35 in contact with the surfaces of the elements, leaving only the end leads 39 exposed. When implemented with loaded transducer elements 30, an electrically conductive heavy-mass material 32 (e.g., Tungsten) is used when the conductor 37 is placed along the outer surfaces of the loaded transducers 30. Other embodiments may be implemented with the conductor disposed between the transducer elements and heavy-mass material (not shown).

Figure 7:
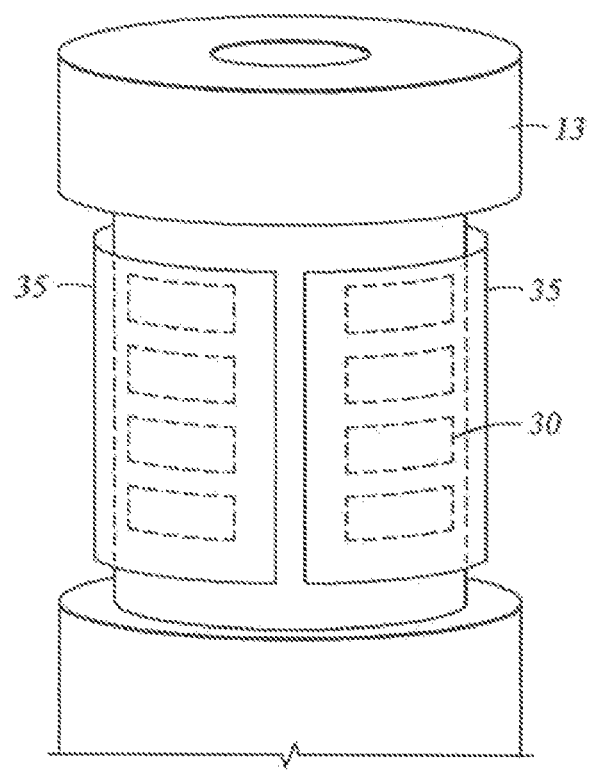
FIG. 7 is a schematic of two individual arcuate shaped acoustic transducers mounted on a tubular in accord with the invention.

FIG. 7 shows a transducer embodiment of the invention. Two independent arcuate shaped members 35 of the invention are disposed within a recess formed around the exterior circumference of a tubular 13. U.S. Pat. No. 6,788,065 describes various tubulars configured with recess and shield configurations that may be used to implement embodiments of the invention. The members 35 each form half of the cylindrical surface of revolution surrounding the tubular 13. The conductor leads from the members 35 are not shown for clarity of illustration. It will be understood by those of ordinary skill in the art that the electrical leads (items 39 in FIG. 6) from the members 35 can be coupled, directly or indirectly, to an electrical source via myriad conventional means. The two independent arcuate shaped members 35 offer many advantages over conventional single unit sources. The individual members 35 facilitate assembly, troubleshooting, repair, and replacement of the transducer apparatus.

Figure 8:
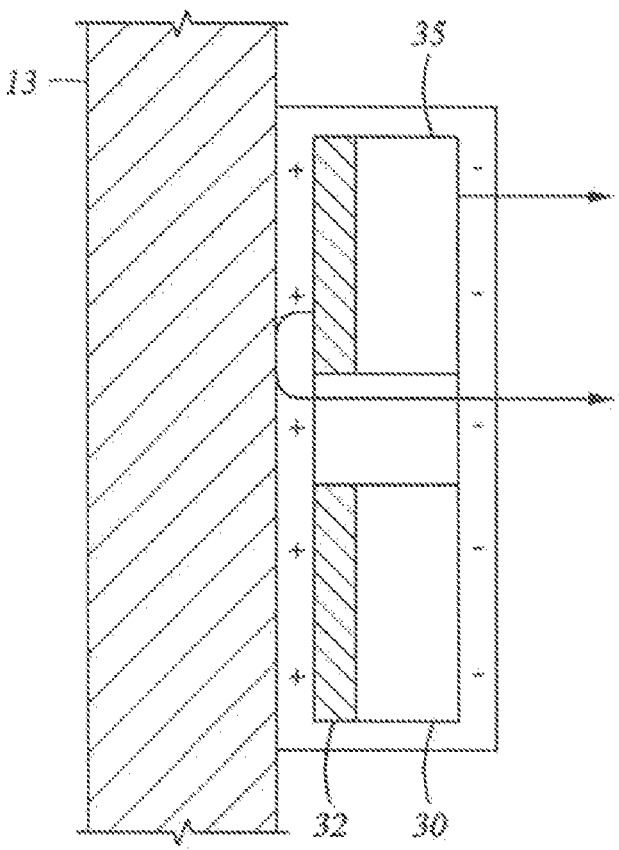
FIG. 8 is a cross-section view of the arcuate shaped transducer disposed on the tubular in FIG. 7.

FIG. 8 shows a cross section of one of the transducer disposed on the tubular 13 in FIG. 7. The sealed arcuate shaped member 35 is placed in juxtaposition with the tubular 13 outer surface with the unloaded transducer element 30 surface exposed to emit acoustic energy in a broad frequency range when activated as a source. The combined heavy-mass material 32 and high-sensitivity transducer element 30 aid in decreasing vibrations in the tubular and improve sound directionality. The placement of the loaded element 30 adjacent to the tubular 13, which is typically metallic, improves sound directionality by reflecting some of the acoustic energy away from the tubular surface to combine with the acoustic energy emitted from the outer surface of the element 30. This attenuation of acoustic energy propagation in the direction of the tubular 13 decreases the excitation of so called "tool modes."

Figure 9:
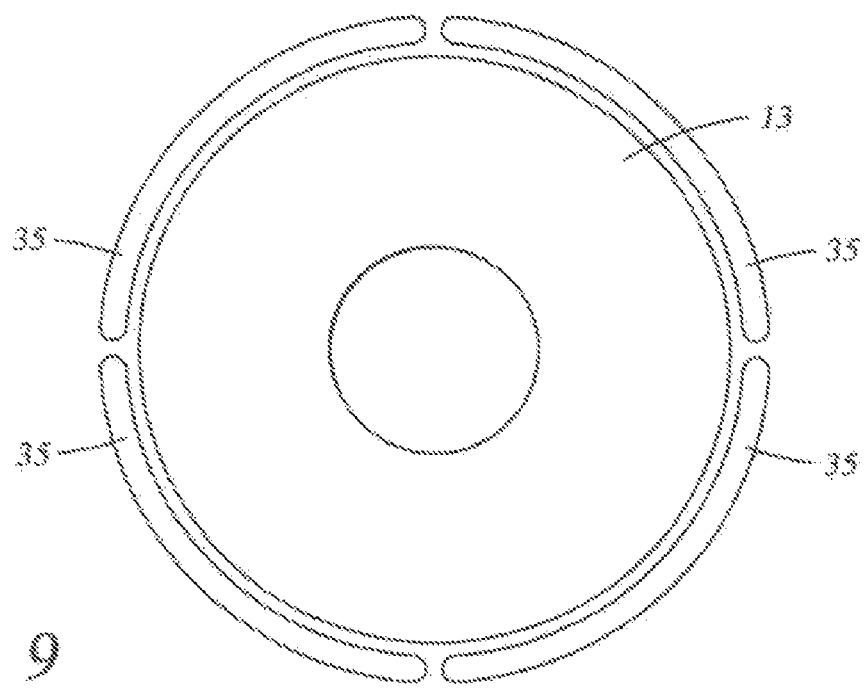
FIG. 9 is an overhead view of four individual arcuate shaped members forming quadrants of a cylindrical surface of revolution disposed on a tubular in accord with the invention.

Transducer embodiments of the invention may be implemented with multiple arcuate shaped members disposed around a tubular. FIG. 9 shows an overhead view of four individual arcuate shaped members 35 of the invention, each forming a quadrant of a cylindrical surface of revolution, disposed around a tubular 13. Conductors and transducer elements are not shown in all figures for clarity of illustration.

Figure 10:
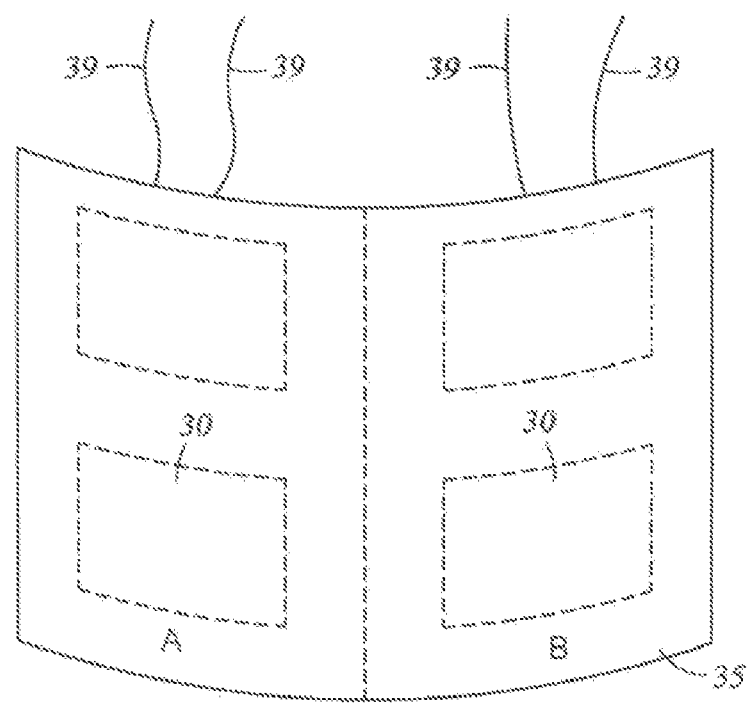
FIG. 10 is a 2-D projection of an arcuate shaped member configured with electrically isolated sets of transducer elements in accord with the invention.

The arcuate shaped transducers of the invention can also be electrically configured to provide separate and timed excitation or reception from subsets of the transducer elements on any one arcuate shaped member. FIG. 10 shows an arcuate shaped member 35 of the invention projected as a two-dimensional or planar surface internally configured with an additional set of conductors so that the transducer elements on side A are electrically isolated from the transducer elements on side B.

Figure 11:
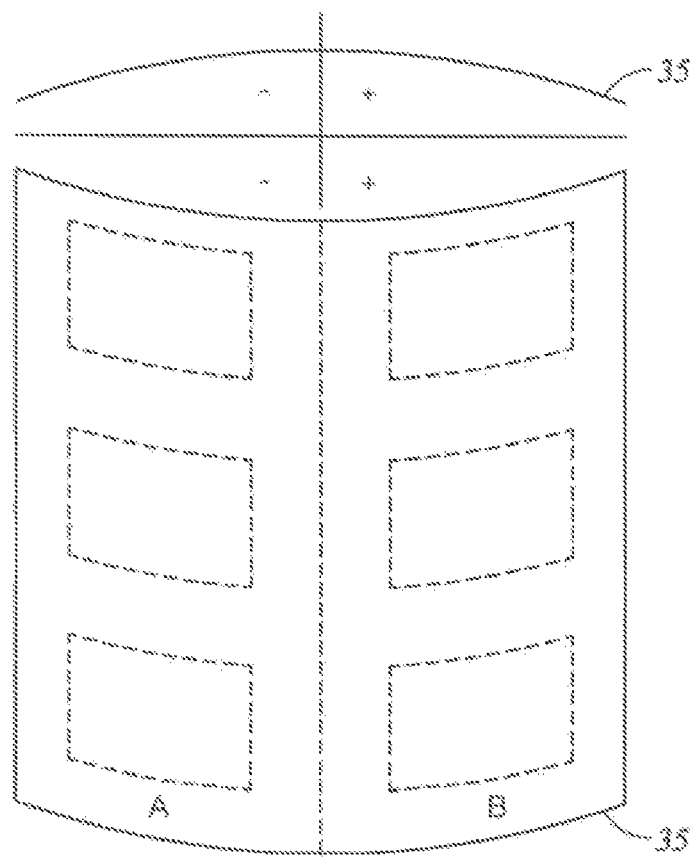
FIG. 11 is a schematic of two arcuate shaped members similar to the embodiment shown in FIG. 10.

FIG. 11 shows two arcuate transducers, similar to those shown in FIG. 10, juxtaposed with one another to form a cylindrical surface of revolution. When implemented as a source on a downhole tubular, the transducer element subsets in the two arcuate shaped members 35 can be excited separately in a selected pattern to effectively excite a wellbore's acoustic modes as desired. FIG. 11 shows the transducer elements on the left or "A" side of the picture excited simultaneously with one polarization and the elements on the right or "B" side excited simultaneously with opposite polarization to produce a dipole mode excitation. Alternatively, the four-quadrant arcuate transducer embodiment shown in FIG. 9 can also be used to produce the desired excitations. It will be appreciated by those of ordinary skill in the art that the arcuate shaped transducers of the invention can be operated as sources to excite wellbore acoustic modes such as monopole, dipole, quadrupole, and higher-order modes. It will also be understood that the arcuate shaped transducers can be adapted to produce separate signals associated with detected acoustic energy in a selected pattern or timing sequence.

FIG. 12 shows another arcuate shaped member 35 of the invention internally configured with additional sets of conductors so that the transducer elements on segments A, B, and C are electrically isolated from one another. By exciting/enabling the elements in a desired pattern or timing sequence, a phased array of acoustic energy/signals can be obtained. For example, the transducer embodiment in FIG. 12 can be configured such that the subset of elements 30 in section A are excited/enabled at time T1, subset B at T2, and subset C at T3. It will be understood by those of ordinary skill in the art that conventional electronics and processor means can be linked to the arcuate shaped transducers to attain these functions as known in the art.

Other transducer embodiments of the invention can be implemented with metallic arcuate shaped members. FIG. 13 shows an overhead cross-section of a metallic arcuate shaped member 35. The member 35 may be formed of any suitable metal (e.g., aluminum, stainless steel). An electrically conductive metal is preferred so that the member 35 itself may be used as a conductor to supply the voltage to the transducer elements 30. The transducer elements 30 may be affixed to the metallic member 35 using a conductive adhesive or they may be simply encased in place by the overmolding 40 used to seal the transducer. The elements 30 may be disposed on a smooth-surfaced metallic member 35 or within voids or indentations formed in the metallic member 35 (not shown). Any suitable nonconductive material 40 may be used to cover and seal the elements 30 as described above. With a conductive member 35, an electrical lead 39 is used to link the member with an electrical source. As described above, a conductor 37 is disposed over the outer surfaces of the elements 30 to electrically connect them in parallel. Embodiments configured with a nonconductive metallic arcuate shaped member may be implemented using another conductor to provide voltage to the transducer elements as described herein. A metallic member 35 transducer provides the desired acoustic energy attenuation and improved sound directionality without using loaded elements 30. The metallic transducer embodiments of the invention may be disposed on tubulars in the same manner and in the same configurations described with respect to the non-metallic embodiments.

The arcuate shaped transducer of the invention may be disposed to encompass the full circumference of a tubular 13 as shown in FIG. 7 and FIG. 9, to encompass specific sectors, or in staggered azimuthal sectors along the longitudinal axis of the tubular (not shown). The arcuate shaped design of the disclosed transducers allows their placement on large or small diameter tubulars. Unlike conventional acoustic transducers (e.g., those using oil compensation), the compact and liquid-free configurations of the disclosed transducers allow them to be mounted and retained on a tubular using any suitable means known in the art. For example, when implemented in wireline instruments or other applications where abrasion is not a critical factor, the transducers may be simply potted with a suitable compound into a cavity in the tubular (not shown) since they are sealed waterproof.

Figure 14:
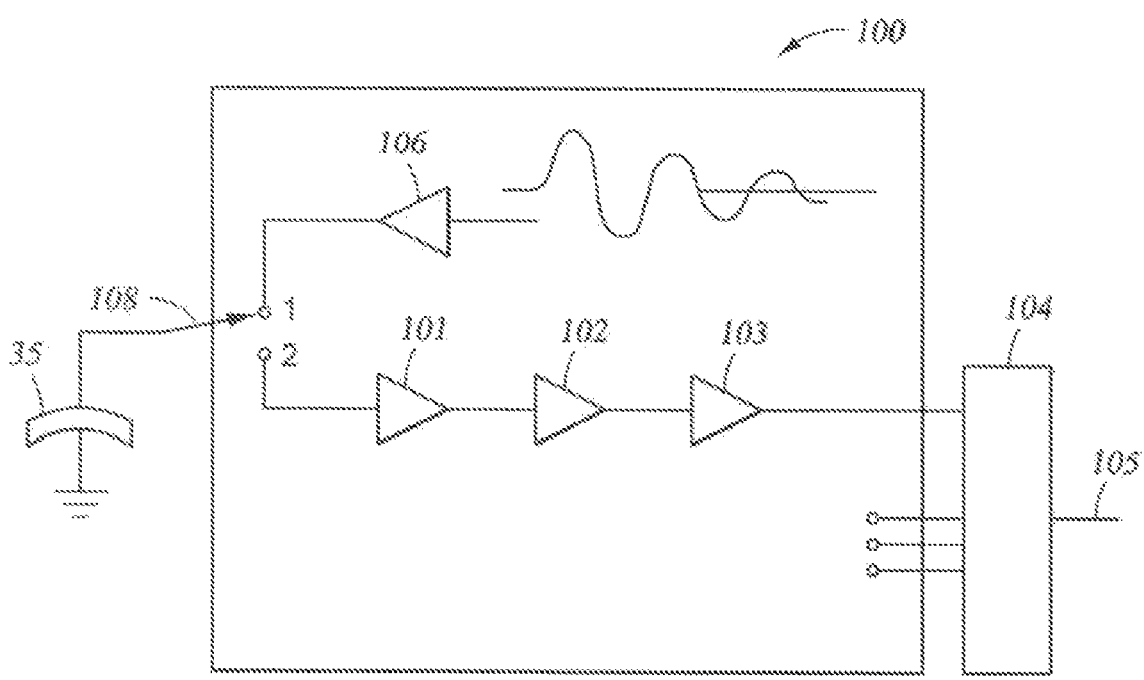
FIG. 14 is a schematic of a transducer electronics module and multiplexer module in accord with the invention.

FIG. 14 shows a general schematic layout of an electronics module 100 that can be linked to an arcuate shaped transducer 35 embodiment of the invention. The module 100 includes a preamplifier stage 101, a filter stage 102, an analog-digital converter (ADC) stage 103, and a power amplifier stage 106. The module 100 is shown linked to an n-to-1 multiplexer (MUX) unit 104 adapted to funnel "n" signals to one channel for output through lead 105. A switch 108 linked to the arcuate transducer 35 toggles between position 1 and position 2. In position 1, the transducer 35 elements are activated by the power amplifier stage 106 and the transducer is implemented as a source. A multiphase voltage may be applied to the transducers of the invention. With the switch 108 in position 2, the preamplifier stage 101 receives the analog acoustic energy signal data detected by the element(s) for processing through the module 100 to implement a receiver. A small package and low power electronics module 100 minimizes power consumption and improves noise reduction since digital signals are cleaner compared to analog signals. The digitized signal data can also be routed far distances for additional processing free of unwanted noise if desired.

The dual-purpose transducers 35 (i.e., source-sensor) of the invention allow for pulse echo measurements. As known in the art, the measurement of two-way travel time of a pulse echo signal reflected from the wellbore wall can be used to determine the wellbore geometry, such as its radius. Using an electronic module 100, the transducers can be switched between modes to obtain the pulse echo measurements in the wellbore. The measured acoustic signal data can be processed using conventional techniques known in the art.

Figure 15:
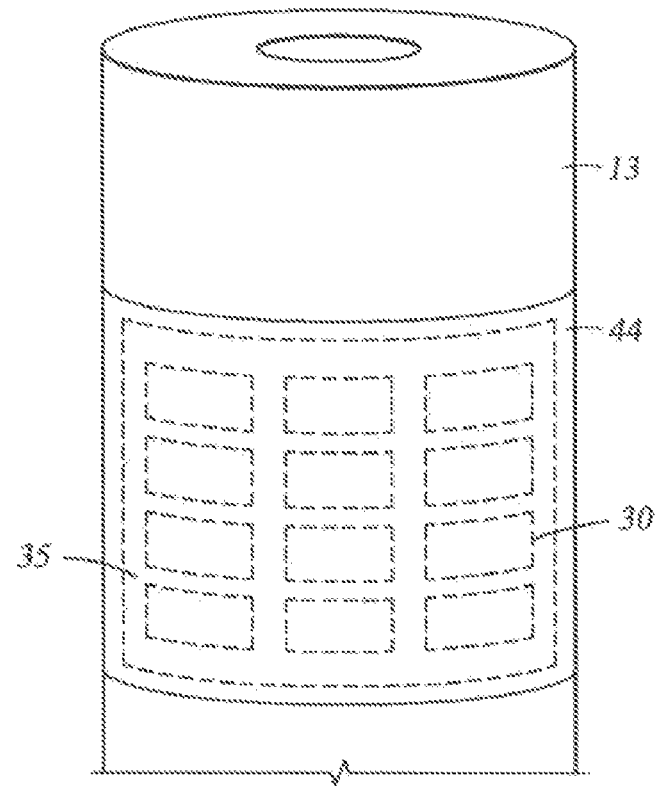
FIG. 15 is a schematic of a shielded arcuate shaped transducer mounted on a tubular in accord with the invention.
Figure 16:
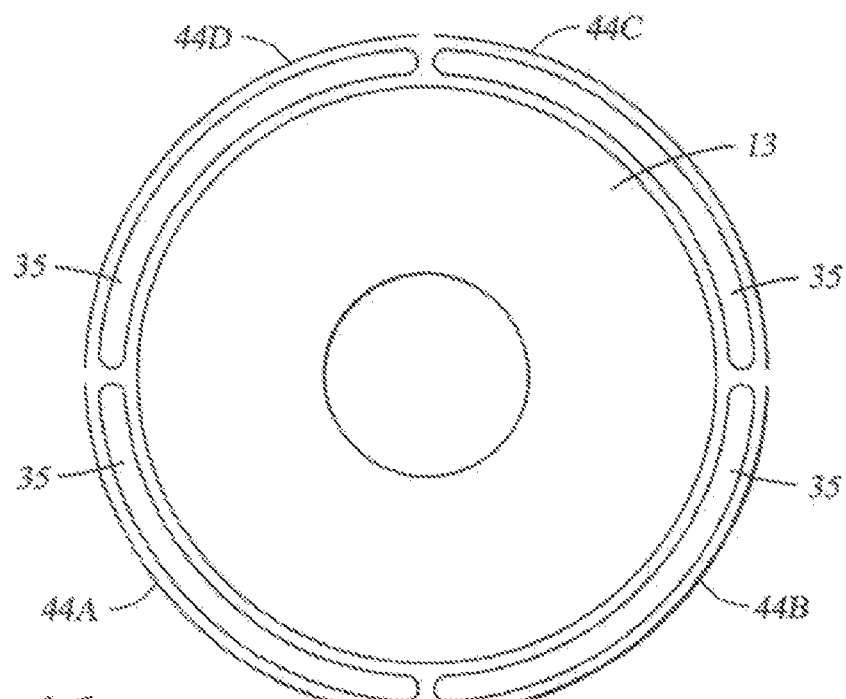
FIG. 16 is an overhead view of a multi-member arcuate shaped transducer disposed on a tubular with matching shields in accord with the invention.

As known by those skilled in the art, in addition to extreme temperatures and pressures, tubulars designed for downhole use are subjected to a rugose and abrasive wellbore environment, where formation cuttings are likely to damage the apparatus. Downhole conditions progressively become more hostile at greater depths, which exacerbates degradation of external or exposed components. Further, fatigue loading (i.e., the bending and rotating of the tubulars in LWD operations) becomes an issue in drilling operations. Turning to FIG. 15, one or more shields 44 can also be placed on the tubular 13 to cover and protect the arcuate shaped transducers. The shields 44 may be formed of metal, plastic compounds (e.g., PEEK™), or any suitable materials known in the art. The shield(s) 44 may be mounted on the tubular 13 using fasteners (e.g., screws) or any suitable means known in the art. FIG. 16 shows an overhead view of a wellbore apparatus comprising a tubular 13 equipped with four arcuate shape members 35 of the invention. The tubular 13 is also equipped with four individual shields 44A, 44B, 44C, 44D covering the four arcuate transducers.

Figure 17:
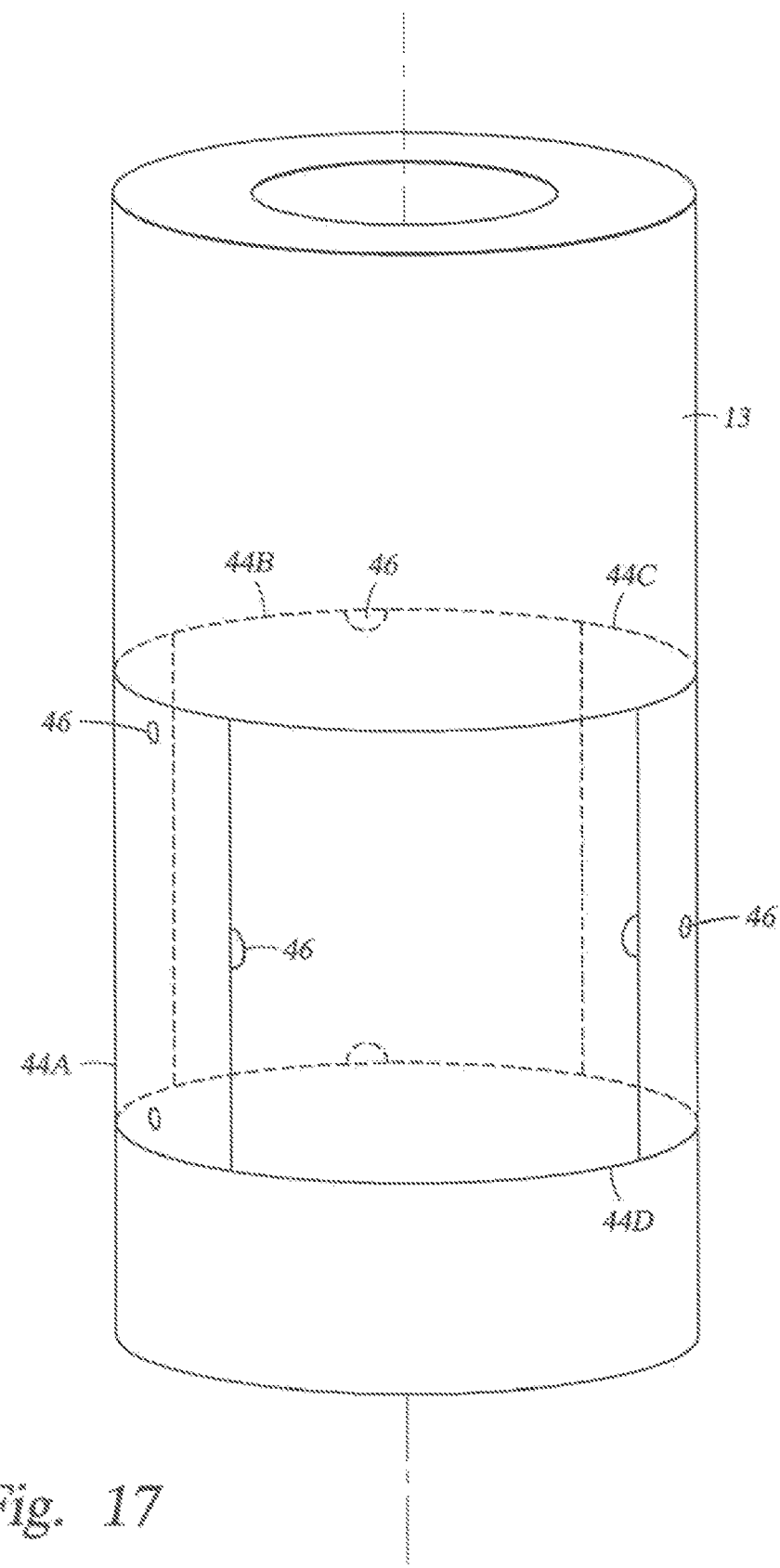
FIG. 17 is a schematic of a tubular equipped with arcuate shaped transducers and protective shield embodiments in accord with the invention.

The shields 44 are preferably configured with apertures (e.g., holes or slots) to allow the passage of wellbore fluids within the spacing between the shield(s) and arcuate shaped member(s) 35. FIG. 17 shows an embodiment of the invention including four independent shields 44A, 44B, 44C, 44D disposed on a tubular to surround four arcuate shape members 35 as described in FIG. 16. As shown in FIG. 17 for illustration purposes, the aperture(s) 46 may be formed on different locations on the shields 44. Shield 44A is configured with two apertures 46 formed near the upper and lower edges. Shield 44B is configured with apertures 46 formed at the upper and lower edges. Shield 44C is configured with an aperture 46 formed in the center. And shield 44D is configured with half-moon apertures 46 formed on the side edges. The arcuate shaped transducers are not shown in FIG. 17 for clarity of illustration.

Alternative embodiments may be configured using a one-piece shield to cover the arcuate shaped transducers and/or with aperture-free shields (See FIG. 15). The shield(s) may be mounted on the tubular 13 using any suitable means known in the art. As mentioned above, signal/power connections with the arcuate shaped members of the invention can be implemented using various well-known techniques. Additional desired components (e.g., electronics, telemetry means, memory storage, etc.) can also be implemented with embodiments of the invention as known in the art.

A process for deploying an acoustic transducer of the invention on a tubular entails disposing an arcuate shaped member on the exterior of the tubular, the arcuate shaped member being independently formed with respect to the tubular and having a plurality of acoustic transducer elements disposed thereon forming rows. The arcuate shaped member being adapted with conductors to provide a voltage to the transducer elements and covered with a sealing material to implement a liquid-free unit.

Another process for deploying an acoustic transducer of the invention on a tubular entails disposing a metallic arcuate shaped member on the exterior of the tubular, the arcuate shaped member being independently formed with respect to the tubular and having at least one acoustic transducer element disposed thereon. The metallic arcuate shaped member being covered with a sealing material to implement a liquid-free unit.

Figure 18:
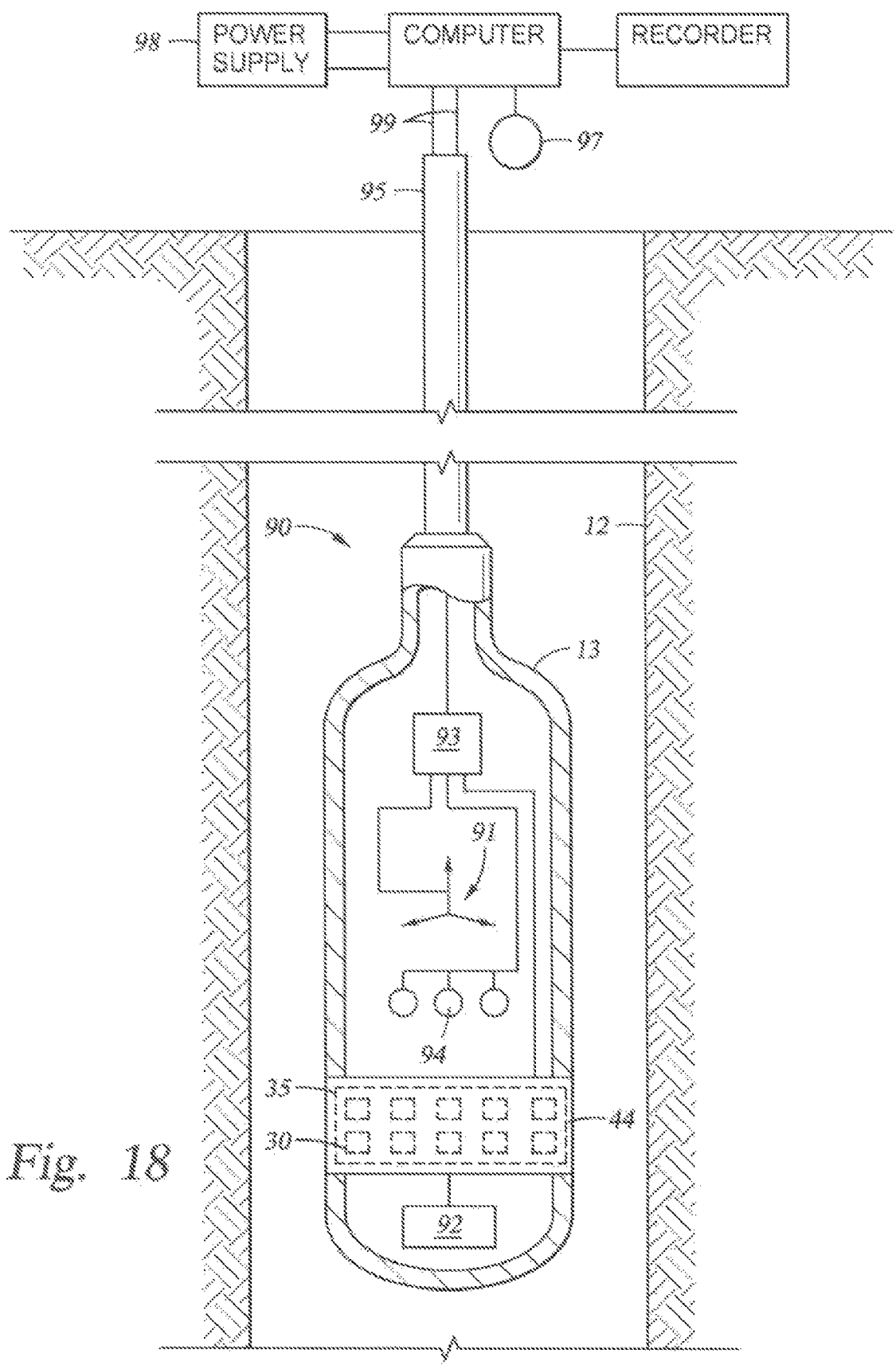
FIG. 18 is a schematic of a wellbore apparatus including an arcuate shaped transducer in accord with the invention.

FIG. 18 shows another embodiment of the invention. An arcuate shaped transducer of the invention is mounted in a downhole apparatus 90 disposed in a wellbore 12 that penetrates an earth formation. The arcuate shaped member 35 is located in a shallow recess on the tubular 13 and a shield 44 is mounted over the transducer as described herein. The tubular 13 also includes a multi-axial electromagnetic antenna 91 for subsurface measurements and electronics 92, 93 with appropriate circuitry. A series of conventional acoustic sensors 94 are also mounted on the tubular 13 as known in the art. The tubular 13 is shown supported in the wellbore 12 by a logging cable 95 in the case of a wireline system or a drill string 95 in the case of a while-drilling system. With a wireline application, the tubular 13 is raised and lowered in the wellbore 12 by a winch 97, which is controlled by surface equipment 98. Logging cable or drill string 95 includes conductors 99 that connect the downhole electronics 92, 93 with the surface equipment 98 for signal and control communication. Alternatively, these signals may be processed or recorded in the tubular 13 and the processed data transmitted to the surface equipment 98 as known in the art. Any of the arcuate shaped transducer embodiments of the invention may be mounted on conventional tubulars as described herein. Conventional electronics, linking components, and connectors may be used to implement the arcuate transducers of the invention on measurement and communication apparatus as known in the art.

It will be appreciated by those of ordinary skill in the art that the present invention is applicable to, and can be implemented in, any field where acoustic transducers are used; it is not limited to subsurface tubular related applications. It will also be appreciated that the disclosed transducers are not limited to operation within any specific frequency or frequency range. Embodiments can also be implemented with transducer elements configured in other shapes and dimensions besides rectangular elements.

What is claimed is:

1. A method of producing an acoustic transducer for use on a tubular, comprising:
   disposing an arcuate shaped member formed as a sector of a cylindrical surface of revolution on the tubular;
   disposing a plurality of acoustic transducer elements on the member to receive or emit acoustic energy, the arcuate shaped member being configured to provide voltage to the elements;
   configuring a first conductor in contact with first planar surfaces of the transducer elements;
   configuring a second conductor in contact with second planar surfaces of the transducer elements;
   the transducer elements on the first planar surfaces electrically isolated from the transducer elements on the second planar surfaces;
   configuring a subset of the plurality of transducer elements disposed on the member for activation with a voltage of different polarity in relation to another element disposed thereon; and
   sealing the member and transducer elements to form a liquid-free acoustic transducer,
   wherein the tubular has an exterior surface configured for contact with well-bore environment, and the acoustic transducer is configured for placement around the exterior surface of the tubular in contact with well-bore environment.

2. An acoustic transducer for use on a tubular for subsurface disposal, comprising:
   an arcuate shaped member formed as a sector of a cylindrical surface of revolution for disposal on the tubular;
   a plurality of acoustic transducer elements disposed on the member to receive or emit acoustic energy;
   the arcuate shaped member configured to provide voltage to the elements;
   a first conductor in contact with first planar surfaces of the transducer elements;
   a second conductor in contact with second planar surfaces of the transducer elements;
   the transducer elements on the first planar surfaces electrically isolated from the transducer elements on the second planar surfaces;

a subset of the plurality of transducer elements disposed on the member configured for activation with a voltage of different polarity in relation to another element disposed thereon; and the member and transducer elements being sealed to form a liquid-free acoustic transducer, wherein the tubular has an exterior surface configured for contact with well-bore environment, and the acoustic transducer is configured for placement around the exterior surface of the tubular in contact with well-bore environment.

3. The transducer of claim 2, wherein the arcuate shaped member is adapted for placement around the exterior surface of a tubular.

4. The transducer of claim 2, wherein the acoustic transducer elements are adapted to emit acoustic energy.

5. The transducer of claim 2, wherein the acoustic transducer elements are adapted to receive acoustic energy.

6. The transducer of claim 2, wherein the arcuate shaped member is formed of a substantially nonconductive material.

7. The transducer of claim 2, the arcuate shaped member further comprising a heavy-mass material disposed adjacent to at least one transducer element to attenuate acoustic energy propagation near a concave surface of said arcuate shaped member.

8. The transducer of claim 7, wherein the heavy-mass material consists of Tungsten.

9. The transducer of claim 7, wherein the heavy-mass material is electrically conductive.

10. The transducer of claim 2, wherein said first and second conductors each comprise a series of conductors forming a mesh.

11. The transducer of claim 2, the arcuate shaped member configured to provide a subset of the transducer elements disposed thereon with voltage in a timed sequence.

12. The transducer of claim 2, comprising two arcuate shaped members, each member forming half of a cylindrical surface of revolution for disposal on the tubular and having a plurality of acoustic transducer elements disposed thereon for selective activation to receive or emit acoustic energy.

13. The transducer of claim 2, comprising four arcuate shaped members, each member forming a quadrant of a cylindrical surface of revolution for disposal on the tubular and having a plurality of acoustic transducer elements disposed thereon for selective activation to receive or emit acoustic energy.

14. The transducer of claim 2, the arcuate shaped member configured to provide the transducer elements disposed thereon with a multiphase voltage.

15. The transducer of claim 2, wherein the arcuate shaped member is electrically conductive.

16. The transducer of claim 15, wherein the arcuate shaped member provides a first voltage to first planar surfaces of the transducer elements disposed thereon and a conductor provides a second voltage to second planar surfaces of the transducer elements disposed thereon.

17. The transducer of claim 2, wherein the transducer is configured to operate in monopole, dipole or quadrupole mode.

18. The transducer of claim 2, wherein the transducer is configured for placement around the exterior surface of a wireline tubular.

19. The transducer of claim 2, wherein the transducer is configured for placement around the exterior surface of a while-drilling tubular.

* * * * *